G. SAGUE.
PAMPHLET COVERER.
APPLICATION FILED JAN. 8, 1908.

936,480.

Patented Oct. 12, 1909.
9 SHEETS—SHEET 1.

Fig. 1.

Witnesses:
All Bending
Arthur Marion.

Inventor
George Sague,
By his Attorney
Chas. C. Gill

G. SAGUE.
PAMPHLET COVERER.
APPLICATION FILED JAN. 8, 1908.

936,480.

Patented Oct. 12, 1909.
9 SHEETS—SHEET 3.

UNITED STATES PATENT OFFICE.

GEORGE SAGUE, OF POUGHKEEPSIE, NEW YORK.

PAMPHLET-COVERER.

936,480.   Specification of Letters Patent.   Patented Oct. 12, 1909.

Application filed January 8, 1908. Serial No. 409,762.

*To all whom it may concern:*

Be it known that I, GEORGE SAGUE, a citizen of the United States, and a resident of Poughkeepsie, in the county of Dutchess and State of New York, have invented certain new and useful Improvements in Pamphlet-Coverers, of which the following is a specification.

The invention relates to improvements in machines for applying covers to magazines, pamphlets, books and the like; and it consists in the novel features hereinafter described, and particularly pointed out in the claims.

The machine of my invention, in one practical embodiment thereof, comprises an inclined feed-chute for the uncovered magazines which are placed thereon on edge and with the back or stitched edge downwardly, means for feeding flat or unfolded covers to suitable position below the delivery from said chute, means for applying paste to the back or stitched edge of the respective magazines as they reach the delivery end of said chute and are in position to be ejected downwardly from the bank of magazines on the chute, means for moving the respective uncovered magazines downwardly (after the paste has been applied thereto) upon the covers fed in succession and supported below them upon a pair of rollers and a narrow movable intermediate platen, said means forcing the magazine against the cover and then the magazine and cover (the latter gradually folding upon the magazine) downwardly between said rollers and into a pocket formed between a pair of clamping plates to receive the same, means for actuating one of said plates to effect the firm clamping or pressing of the magazine with the cover thereon, means for pressing, with a wiping action, the cover against the pasted edge of the magazine while the latter is held in the clamp, a delivery for the finished magazines as they are released from said clamping plates, and suitable mechanism for imparting motion to the various operative parts of the machine.

The machine embraces a number of novel features comprised in the mechanism for automatically locating the successive magazines to receive the paste, moving them to the covers and folding the latter thereon, properly sustaining the magazines during their movement from the feed chute and into the covers, and in a finished manner affixing the covers to the magazines, the latter leaving the machine in completed condition ready for shipment or distribution.

The invention will be fully understood from the detailed description hereinafter presented, reference being had to the accompanying drawings, in which:

Fig. 12 is a detached longitudinal section through a lower rear portion of the machine, being the part directly below that illustrated in Fig. 10 and designed to receive the covered magazines therefrom, the magazine shown in Figs. 10 and 11 as descending being in Fig. 12 represented as having passed between a pair of clamping plates and upon a slide which when it recedes (toward the left looking at Fig. 12) will move its shouldered outer edge, with a wiping action, against the pasted edge of the magazine, then firmly held by the clamping plates, for the purpose of assuring the firm and uniform adherence of the cover to the pasted edge of the magazine; in Fig. 12 a magazine is by dotted lines shown as having been released by the clamping plates and descending to the final delivery frame or table for finished magazines.

Figures 9, 10, 11:
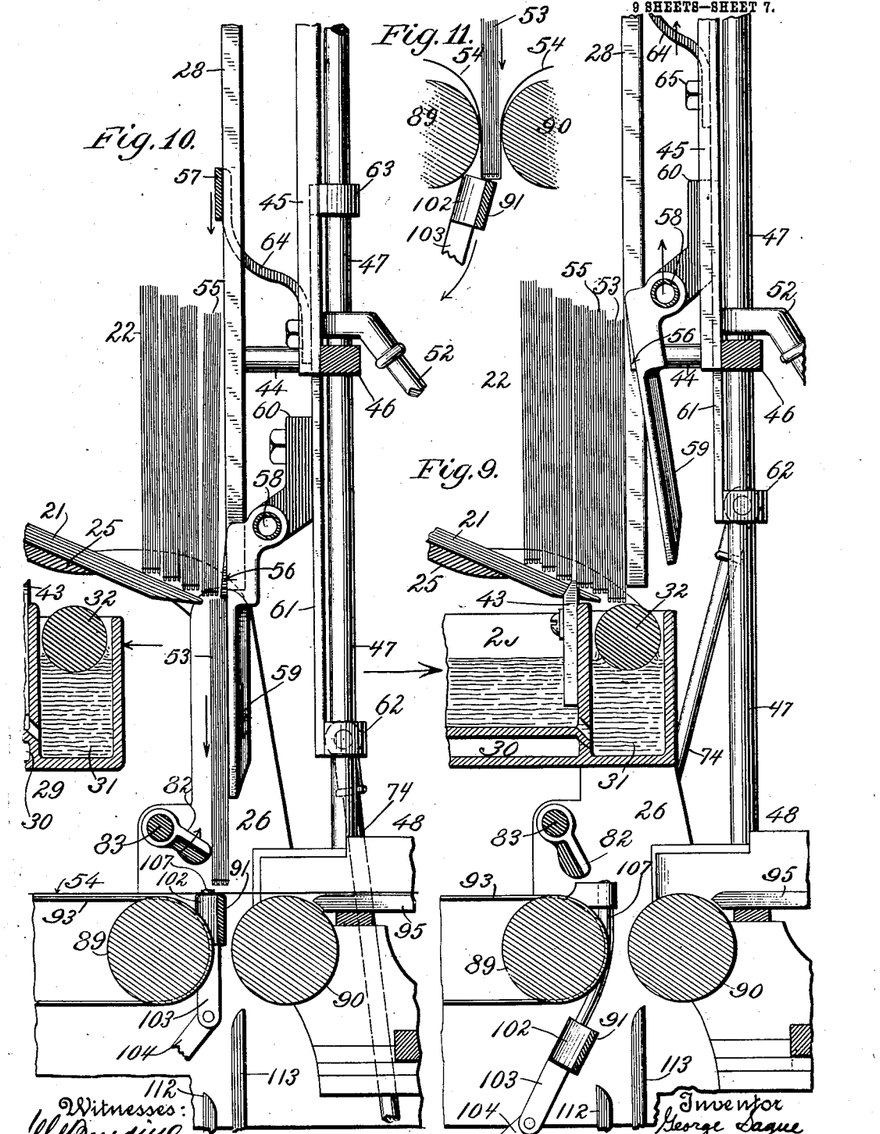
Fig. 9 is a vertical longitudinal section through an upper rear portion of the machine and illustrates a number of uncovered magazines on the inclined feed chute therefor, with the paste roller in the act of applying paste to the stitched or back edge of the outer magazine.
Fig. 10 is a like view of the same, with the parts in a different position, the paste-receptacle being shown as having receded from the magazines and the magazine which received the paste in the condition of the machine represented in Fig. 9, being shown as descending upon the cover, which is shown as extended across and upon two rollers with a narrow movable platen or magazine support between them.
Fig. 11 is a sectional view of a portion of the same and illustrates the magazine as descending between the cover-supporting rollers and pressing the cover downwardly between said rollers, whereby the cover becomes folded upon the magazine and is caused to adhere thereto by the action of the paste previously applied to the magazine; the narrow movable platen which in Fig. 10 is shown in its upper position between the said rollers is in Fig. 11 represented as receding downwardly and frontwardly from the path of the descending magazine.

In the drawings 20, 20 denote suitable side frames for supporting the various parts of the machine, and 21 an inclined chute to receive the magazines, pamphlets or books to be covered, the magazines, numbered 22, being placed thereon on edge and with their stitched or back edge downwardly (Figs. 9 and 10).

The chute 21 is formed of a series of downwardly inclined parallel separated bars 23 connected at the lower side of their upper end portions by a transverse bar 24 (Figs. 2 and 8) and similarly connected at their lower end portions by a broad bar 25 (Figs. 1, 3), which is pivotally secured between the upper ends of standards 26 connected with the side frames 20. The front end of the chute 21 may be supported by rods 140 and turnbuckle 141, by which the bar 25 and chute may be given any desired inclination. The magazines 22 automatically slide down the chute 21. The chute 21 is provided along one side with a bar 27 against which the magazines at one end are placed when delivering the same to said chute, so that the magazines may be uniformly fed to the operative parts of the machine and to the covers to be applied upon them.

Adjacent to the lower end of the feed-chute 21 is secured a vertical transverse frame of separated parallel bars 28 (Figs. 2, 3, 5, 8) against which the bank of magazines 22 on the chute presses and which is sufficiently separated from the chute to permit the lower magazine to be moved downwardly between itself and the chute, as indicated in Figs. 9 and 10. The frame of bars 28 and devices coöperating therewith for moving the magazines in succession downwardly will be hereinafter described.

Figure 6:
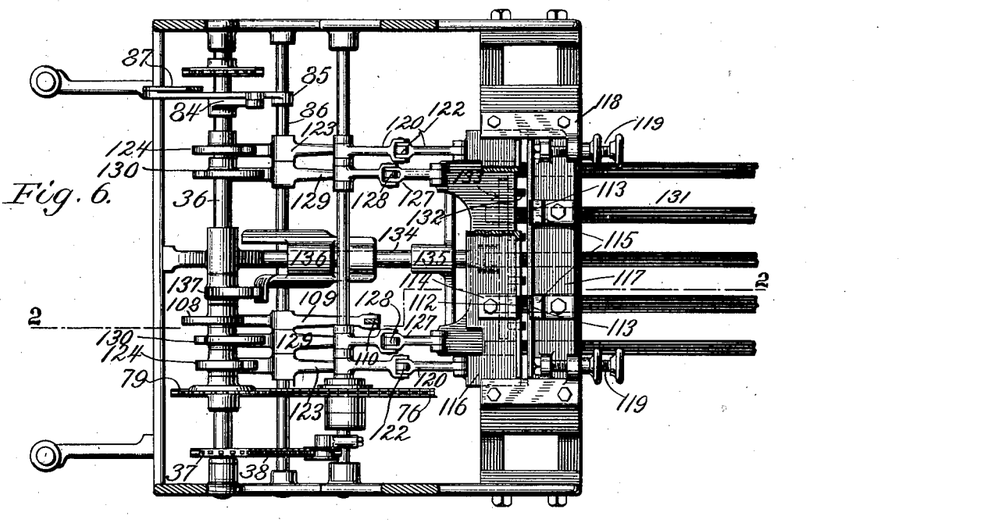
Fig. 6 is a horizontal section through the machine on the dotted line 6—6 of Figs. 2 and 5.

Below the horizontal plane of the lower end of the chute 21 and vertical bars 28 is mounted the paste-receptacle 29, which is adapted to have a reciprocatory motion imparted to it and is formed with a lower hot water or steam chamber 30 (Figs. 9 and 10) and a rear end paste chamber 31 containing a roller 32 which is, during the movement of the receptacle 29, moved rearwardly against the exposed back edge of the lower magazine (Fig. 9) and then frontwardly against the same, said roller being carried rearwardly from the position shown in Fig. 10 to that shown in Fig. 9 and then frontwardly to its position represented in Fig. 10, and thus being enabled to act against the magazine while moving in two directions and insuring the proper application of the paste thereto. The paste-receptacle 29 is mounted upon shoes 33 containing rollers or balls 34 and mounted upon tracks 35 (Fig. 3) secured on the upper edges of the side-frames 20, the purpose being to so mount the receptacle that it may be reciprocated back and forth with the minimum power and friction. The receptacle 29 is reciprocated from the cam-shaft 36 through a sprocket-wheel 37 thereon (Figs. 6 and 8), a sprocket-chain 38 on said shaft, a transverse shaft 39 below said receptacle (Figs. 7 and 8), a sprocket-wheel 40 on said shaft 39 and connected by said chain 38 with said sprocket-wheel 37, crank-arms 41 on said shaft 39 and links 42 connecting said crank-arms with said receptacle. During its rearward movement toward the lowermost magazine the paste-receptacle 29 carries vertical fingers 43 secured to it against the lower magazines, as shown in Fig. 9, to assure the downward feed of the magazines on the chute 21 and the proper and firm locating of the lower magazine in position to be acted on by the paste-roller 32. The fingers 43 project upwardly above the receptacle 29 and pass between the bars 23 of the chute 21 to reach the magazines.

Figure 1:
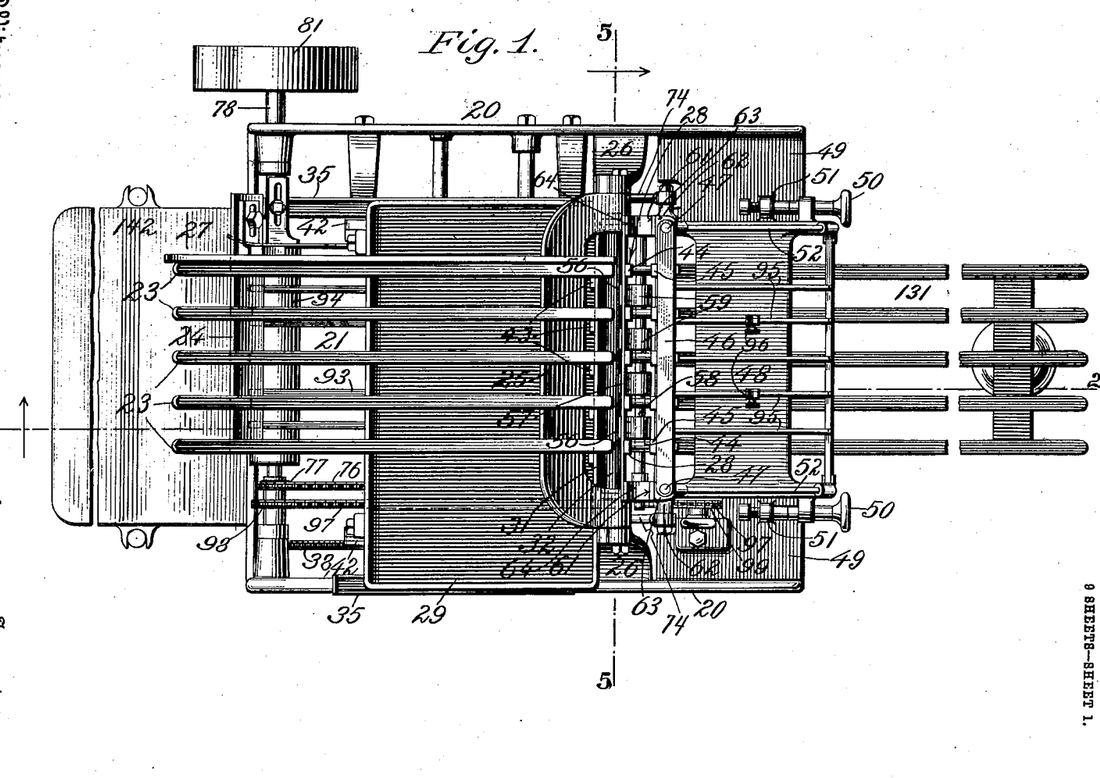
Figure 1 is a top elevation, partly broken away, of a machine constructed in accordance with and embodying the invention.
Figure 2:
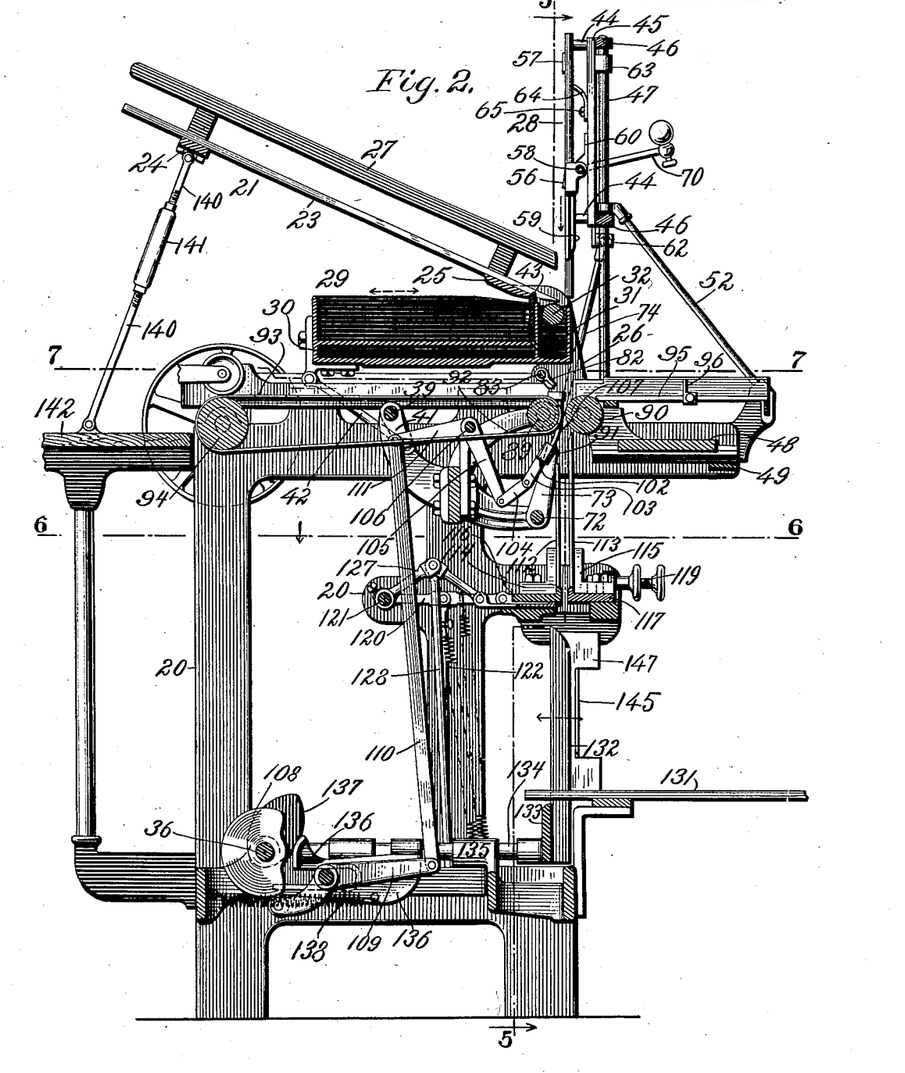
Fig. 2 is a vertical longitudinal section, partly broken away, of the same, the section being on the dotted line 2—2 of Figs. 1, 5 and 6.
Figures 3, 4:
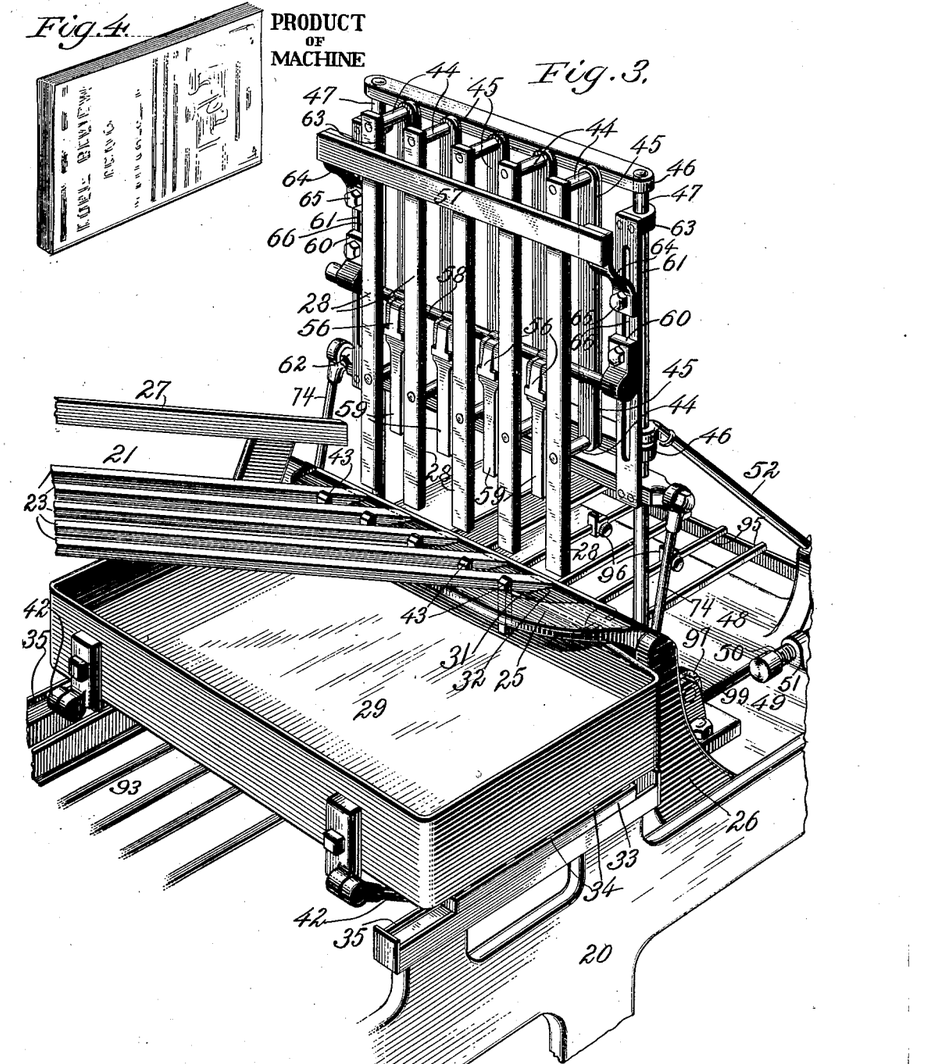
Fig. 3 is a perspective view, partly broken away, of the rear portion of the machine.
Fig. 4 is a perspective view of a magazine having a cover applied thereto.
Figure 5:
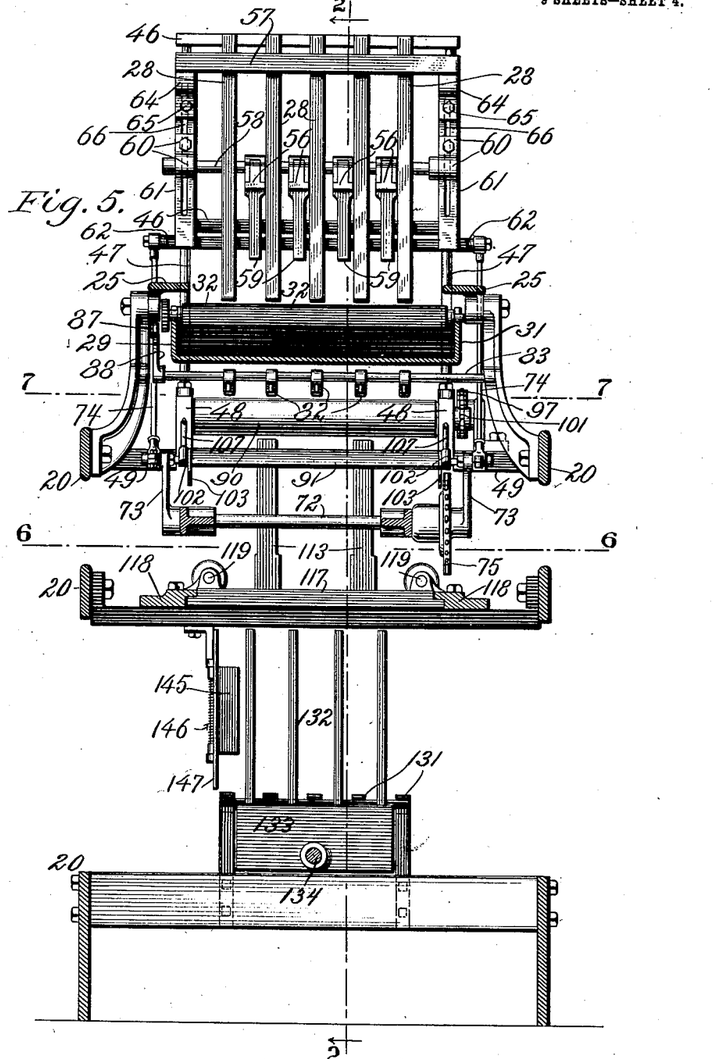
Fig. 5 is a vertical transverse section of the machine, on the dotted line 5—5 of Figs. 1, 2 and 8.
Figure 7:
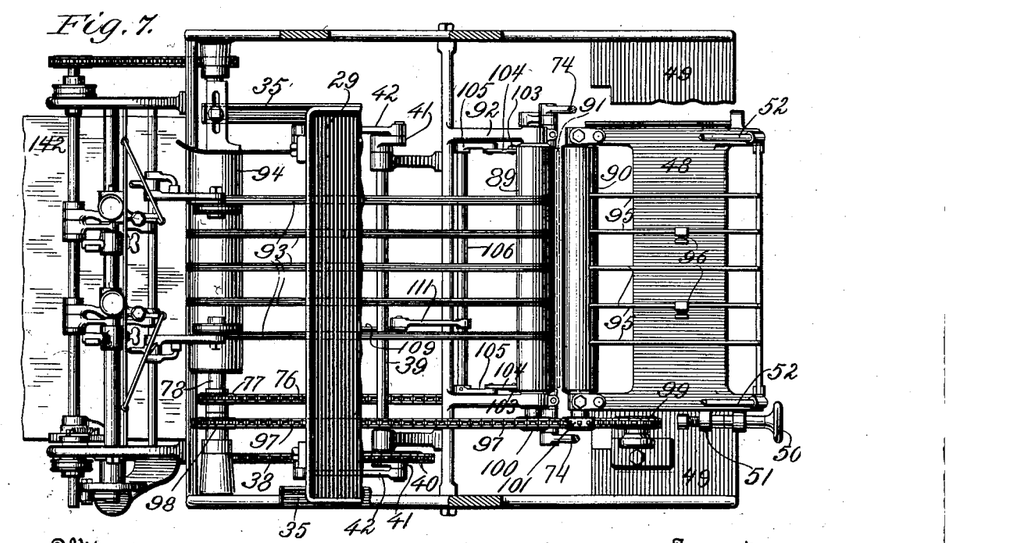
Fig. 7 is a top view, partly broken away and partly in section of the machine, the section being on the dotted line 7—7 of Figs. 2 and 5.

The frame of bars 28 is adjustable toward and from the magazine chute 21, as hereinafter described, to adapt the machine for different thicknesses of magazines, and said frame is otherwise rigid. The bars 28 are connected by bolts 44 with corresponding, though shorter, vertical bars 45, and said bolts 44 secure the open frame of bars 28, 45 to transverse upper and lower bars 46, which, at their ends, are secured upon vertical rods 47 whose lower ends are rigidly secured to a carriage 48 mounted to slide transversely, for purposes of adjustment, upon end portions 49 of a bed-plate at the rear end of the machine (Figs. 1, 3 and 7). The carriage 48 is adjustable by means of adjusting screws 50 carried by it at its ends and engaging internally threaded lugs 51 on said end portions 49 (Fig. 1), and the adjustment of the carriage 48 results in the frame of bars 28, 45 being moved toward or from the magazine chute 21, this being for the purpose of setting the machine for handling the particular thickness of magazine to be covered. I preferably brace the vertical rods 47 by brace-rods 52 which extend upwardly and forwardly from the rear corners of the carriage 48 to said rods 47.

The bank of magazines to be covered presses against the frame of bars 28, and I provide means for forcing downwardly the end magazine, numbered 53, (after the paste has been applied thereto in the manner shown in Fig. 9) to its cover 54 (Figs. 10 and 11) and the next adjacent magazine, numbered 55, to the position in which the magazine 53 is shown in Fig. 9 so that its lower edge may be exposed below the lower edges of the chute 21 and bars 28 preparatory to the application thereto of the paste, and these means for moving one magazine to and into its cover and the next adjacent magazine downwardly only far enough to properly receive the paste will now be described, it being understood that as one magazine is discharged downwardly along the bars 28 the next magazine will move to position against said bars.

The end magazine 53 is moved downwardly and into its cover 54 by a series of spring-dogs 56 which engage the upper edges of said magazine (Fig. 10) and the next adjacent magazine 55 is moved downwardly in position to receive the paste, or to the position of the magazine 53 shown in Fig. 9, by a cross-bar 57, which dogs and cross-bar are carried by a vertically movable frame, and said cross-bar being sufficiently above said dogs to during the descent of said frame engage the upper edge of the magazine 55 after the magazine 53 has been pushed downwardly to its cover and the said magazine 55 has moved against the frame of bars 28. In Fig. 10 the dogs 56 and bar 57 are shown as moving downwardly, and in Fig. 9 the dogs 56 are shown in their ascending movement. The frame carrying the dogs 56 and cross-bar 57 comprises a transverse rod 58 (preferably hollow), a set of depending bars 59 rigidly secured on said rod, bearings 60 for the ends of said rod (Fig. 3), vertical bars 61 to which said bearings are bolted, a lower cross-bar 62 to which the lower ends of said bars 61 are secured and which is mounted to slide on the vertical rods 47, apertured ears 63 secured to the upper ends of said bars 61 and also mounted to slide on said rods 47, and arms 64 which carry the cross-bar 57 and are adjustably secured to the bars 61 by nuts 65, said bars 61 being slotted, as at 66, to permit of the vertical adjustment of the arms 64, whereby the cross-bar 57 may be adjusted to the height of the magazines being handled by the machine.

Figures 12, 13, 14:
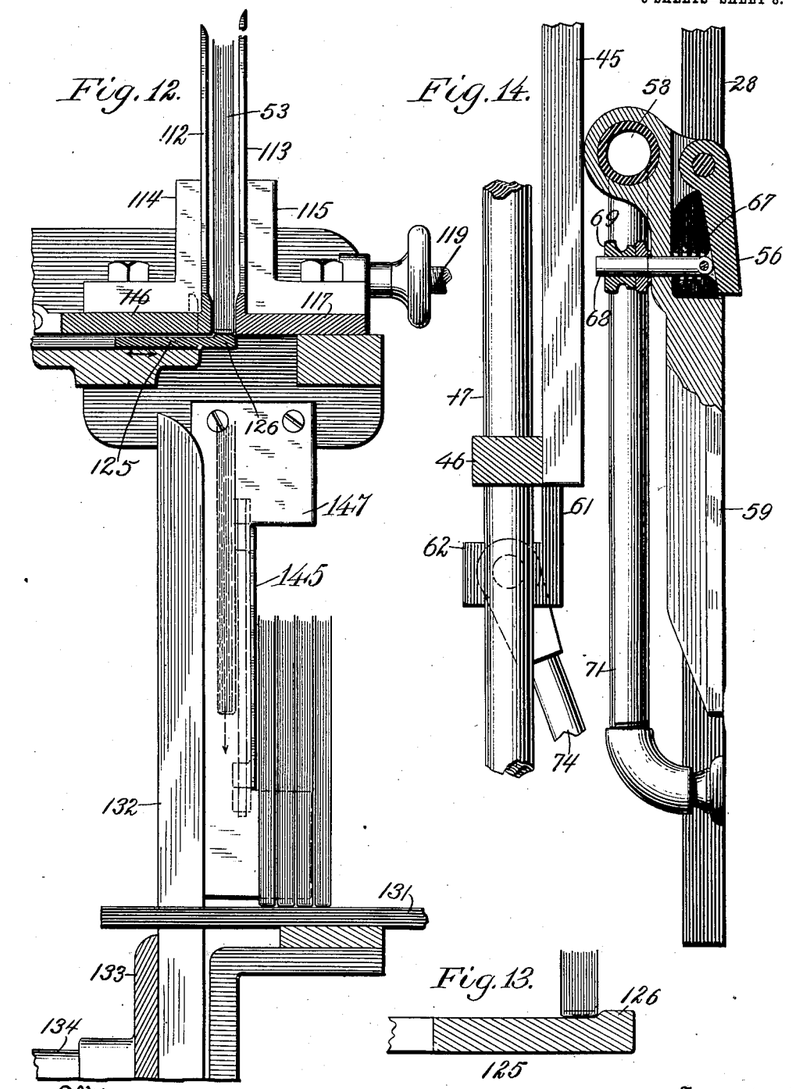
Fig. 13 is an enlarged detached sectional view of a portion of the slide shown in Fig. 12 below the clamping plates and the magazine between said plates.
Fig. 14 is an enlarged sectional view of an upper rear portion of the machine and is presented more particularly to illustrate the construction of the spring-dogs which engage the upper edge of the magazine, as shown in Fig. 10, and push the magazine downwardly upon the cover held upon the rollers to receive it.

The dogs 56 are pivotally hung in the upper ends of the bars 59, as shown in Fig. 14, and are normally pressed outwardly by springs 67. The limit of the outward movement of the dogs 57 may be controlled by rods 68 pivoted to said dogs and extending through the bars 59 and provided with adjusting nuts 69.

The bars 59 are intended to lie flat against the downwardly descending magazine 53 (as shown in Fig. 10) and maintain and guide the same, and to this end the rod 58 carrying said bars is loosely mounted in its bearings 60 and equipped with a weighted arm 70 (Fig. 2) which acts to rock the rod 58 to carry the bars 59 against said magazine and which permits the bars 59 to tilt rearwardly during their ascent when the outer faces of the dogs 56 ride upwardly against the magazine then in position against the bars 28. As soon as the dogs 56 ascend above the magazine then against the bars 28 the weighted arm 70 acts to move the bars 59 against said magazine and project the lower ends of the dogs 56 above the same, so that said dogs may thereafter push said magazine downwardly while it is on one side maintained by said bars 59 (Fig. 10).

I also preferably secure on the hollow rod or rock-shaft 58 hollow air-suction nozzles 71 (Fig. 14) which may move with the bars 59 and are useful, especially when thin magazines or pamphlets are to be covered, in holding vertical and facilitating the movement of the magazines or pamphlets during their descent into their covers. When the suction nozzles 71 are made use of their upper ends will communicate with the interior of the hollow rod 58 and the latter will have attached to its end a suitable suction pump of commercial construction (not shown).

Figure 8:
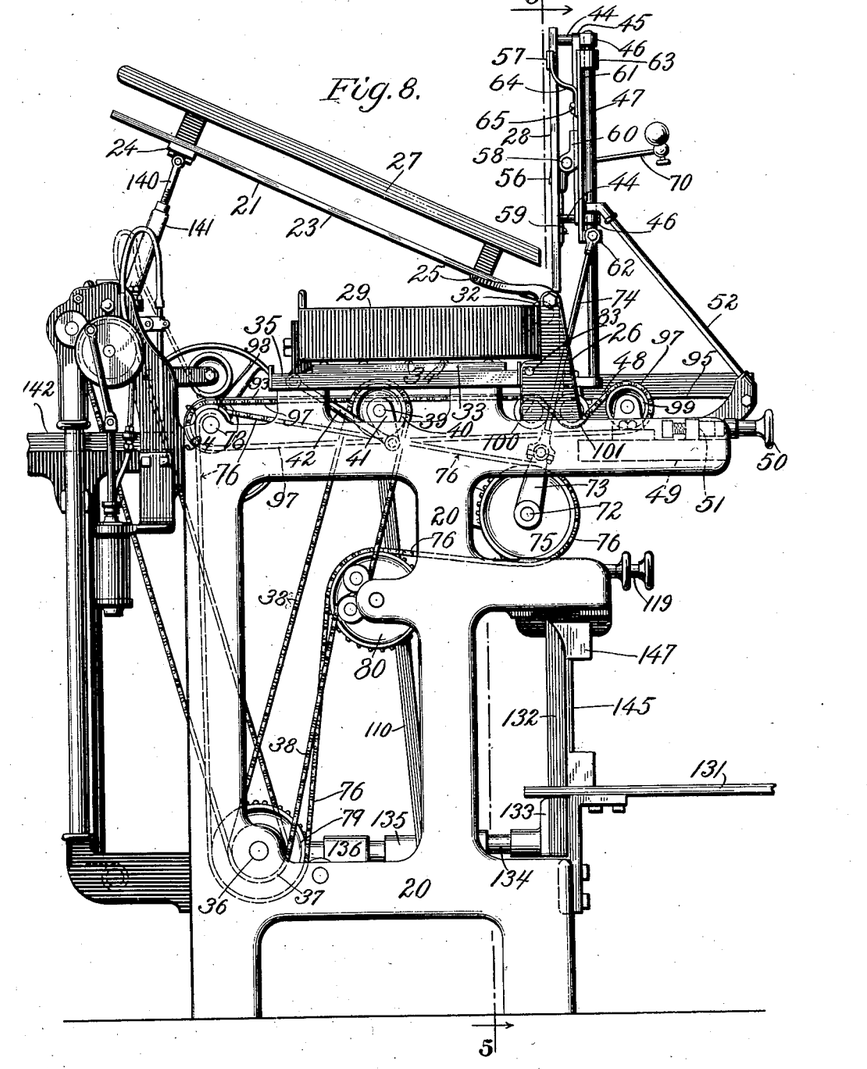
Fig. 8 is a side elevation, partly broken away, of the machine.

The means for imparting to the frame carrying the dogs 56 and cross-bar 57 (and which comprises the rod or rock-shaft 58, bearings 60, vertical bars 61, lower cross-bar 62, ears 63 and arms 64) a vertical reciprocatory motion are shown more clearly in Figs. 2, 3, 5, 7 and 8 and comprise a shaft 72 (Fig. 5), crank-arms 73 on the ends thereof, pitman-rods 74 pivoted to said crank-arms and the ends of said lower cross-bar 62 (Fig. 3) and means for rotating said shaft to actuate said rods 74 and thereby effect the vertical movement of said frame. The means for rotating the shaft 72 comprise a sprocket-wheel 75 (Figs. 5 and 8) on said shaft, a sprocket-chain 76 and a sprocket-wheel 77 on the main driving shaft 78 (Figs. 1, 7 and 8), which chain is on said wheels 75, 77 and also extends downwardly and engages the sprocket-wheel 79 on the cam-shaft 36. The chain 76 also engages an idler sprocket-wheel 80 (Fig. 8). The chain 76 receives its motion from the driving shaft 78 and drives the shaft 72 and also the cam-shaft 36, and the shaft 78 receives its motion from a belt-wheel 81 or other source.

The arms 59 serve to sustain one side of the magazines as the latter are ejected downwardly to their covers 54 by the dogs 56, and I also provide means for engaging and sustaining the opposite side of said magazines during such period, said means in the present instance comprising a set of arms or fingers 82 (Figs. 2, 5, 9 and 10) secured upon a rock-shaft 83 and adapted to be turned from their idle position shown in Fig. 9 to their operative position shown in Fig. 10 against the descending magazine and then back to their idle position. The arms 82 are actuated by the rock-shaft 83 carrying them and said rock-shaft may be given its movement by any suitable connections from a moving part of the machine, those used by me being a cam 84 (Fig. 17) on the cam-shaft 36, an arm 85 freely held upon a rod 86 and engaging at an intermediate part said cam, and a rod 87 pivoted at one end to the outer end of said arm 85 and at its other end to a crank-arm 88 (Fig. 5) on the end of said shaft 83. The rotation of the cam 84 imparts an oscillatory movement to the arm 85 and through said arm a reciprocatory movement to the rod 87, whereby through the crank-arm 88 the rock-shaft 83 is given its rocking movement to position the fingers 82 for sustaining and guiding the descending magazine.

The descending magazines, as hereinbefore indicated and as is illustrated in Fig. 10, are each delivered upon a cover 54, the back edge of the magazine bearing the glue or paste descending centrally upon said cover. The covers 54 are fed one after another in proper time with the descending magazines and become arrested centrally below the vertical plane of said magazines, as hereinafter explained, and upon rollers 89, 90, the middle or folding portion of the covers being centrally between said rollers and upon a narrow platen 91 which stands between said rollers to receive the pressure of the descending magazine, as shown in Fig. 10, and then recedes downwardly with the magazine as the latter passes between the rollers 89, 90, as shown in Fig. 11, said platen 91 finally reaching a position shown in Fig. 9, at which the descending magazine may leave it and pass to the lower parts of the machine. The rollers 89, 90 rotate toward each other so as to feed the magazine and its cover downwardly and fold the cover upon the magazine, as shown in Fig. 11, and the roller 89 is mounted in arms 92 (Fig. 7) forming a rigid part of the machine frame, while the roller 90 is mounted in bearings on the inner end of the slidable carriage 48 so that it may be adjusted (with the frame of bars 28) toward and from the roller 89 in accordance with the thickness of the magazines to be handled. The covers 54 are fed inwardly upon tapes or belts 93 (Figs. 2 and 7) mounted upon said roller 89 and a roller 94 carried by the driving shaft 78, and said tapes force said covers partly across the roller 90 and upon a grid of bars 95 (Figs. 1, 2 and 7) secured upon the carriage 48 and provided with adjustable stops 96 for arresting the covers when the advancing edges of the latter reach them, the covers being thus fed inwardly and arrested upon the rollers 89, 90 in proper position to receive the magazines.

The rollers 89, 90 receive their rotary motion toward each other from a sprocket-chain 97 (Figs. 1, 7, 8) mounted on a sprocket-wheel 98 on the main driving shaft 78 and a sprocket-wheel 99 secured upon a rigid rear portion 49 of the machine frame, which chain travels upon the upper edge of a sprocket-wheel 100 (Fig. 7) on the shaft of the roller 89 and upon the lower edge of a sprocket-wheel 101 on the shaft of the roller 90. Since the sprocket-wheels 98, 99 are on fixed parts of the machine and the chain 97 merely travels against the sprocket-wheels 100, 101, the roller 90 may be adjusted toward and from the roller 89 without disturbing said chain, which is a matter of importance.

The platen 91 when between the rollers 89, 90 is of importance in that the back edge of the magazine upon reaching its cover 54 presses upon said platen, which then firmly supports the middle portion of said cover and thereby prevents the distortion of the cover and assures the firm pressing of the glued-edge of the magazine against the cover. The platen 91 is a bar having sleeves 102 upon its ends and secured to arms 103 which are pivoted to links 104 (Figs. 2, 7, 10) pivotally connected with crank-arms 105 carried by a rock-shaft 106, whose movement effects the movement of said platen 91 from its lower position shown in Fig. 9 to its upper position shown in Fig. 10 and then back to its said lower position with the descending magazine, said platen being guided in said movements on stationary curved rods 107 (Figs. 5, 9) which pass through said sleeves 102. The rock-shaft 106 receives its timed movement from the cam-shaft 36 through the cam 108 thereon (Figs. 2, 6), a pivotally mounted lever 109 which at one end engages said cam, and a vertically disposed connecting rod 110 pivoted at its lower end to said lever 109 and at its upper end to a crank-arm 111 rigid on said shaft 106.

The magazine on descending with its cover between the rollers 89, 90 in the manner shown in Fig. 11, enters the space between two clamping frames 112, 113, the latter of which is normally rigid, while the former is movable toward and from the frame 113. These frames 112, 113, may each comprise two vertical bars (Figs. 5 and 12) secured to angle-iron brackets 114, 115 (Figs. 15 and 16) carried respectively by a slide 116 and an adjustable plate 117, the latter being mounted in guides 118 (Fig. 5) and rendered adjustable by means of screws 119 so as to permit the setting of the frame 113 in an initial relation to the frame 112 consistent with the thickness of the magazines to be covered. The frame 112 is moved frontwardly or in a direction from the frame 113 when a magazine is to descend between said frames and is then moved toward said frame 113 in order to press the magazine, especially at its then lower or back-edge. It may be seen in Figs. 15 and 16 that the facing edges of the slide 116 and plate 117 extend toward each other beyond the inner vertical planes of the upper portions of the frames 112, 113, and this is for the purpose of enabling said slide and plate to press together the opposite side portions of the then lower back-edge of the magazine while the upper portions of the magazine are held together and sustained by the upper vertical portions of the said frames 112, 113.

The means I provide for moving the frame 112 from and toward the frame 113, first to admit the magazine, then to press it and then to release it, comprise toggle-levers 120 (Figs. 6, 15 and 16) secured at one end to the slide 116 and at their other end retained on a rod 121, vertical connecting rods 122 pivoted at their upper ends to the jointed ends of said levers 120, pivotally mounted levers 123 to which the lower ends of said rods 122 are pivoted and cams 124 on the cam shaft 36 (Fig. 6), whereby the frame 112 is given a positive pressure against the magazine. The toggle-levers 120 are folded downwardly to withdraw the frame 112 under the force of springs 138 connected with them and are straightened out on an upward movement to exert their pressure by the cams 124.

Figures 15, 16, 17:
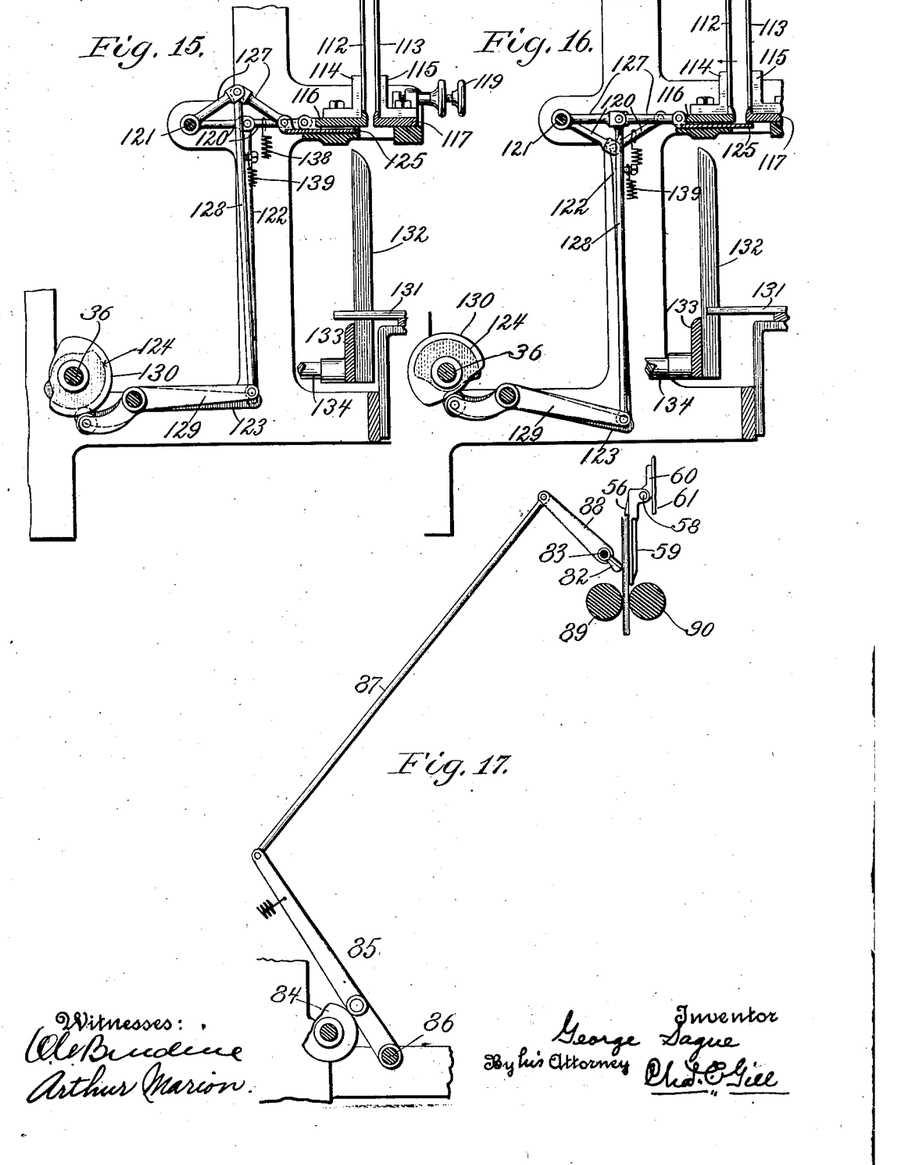
Fig. 15 is a detached sectional view illustrating the cam and toggle mechanisms for actuating the slide and movable clamping plate shown enlarged in Fig. 12, Fig. 15 showing the clamping plate as pushed to its operative position and the slide as having been drawn from below the space between the clamping plates.
Fig. 16 is a like view of the same but showing the movable clamping plate as having been withdrawn in a direction from the fixed clamping plate and the slide as having been pushed to position across the lower end of the space between the said plates where it may serve as a support to receive the magazine to descend between said plates.
Fig. 17 is a detached view of the mechanism for moving a set of fingers to position against one face of the magazine for sustaining one vertical side of the latter while the magazine is being pressed downwardly into its cover in the manner more clearly denoted in Fig. 11.

Below the clamping frames 112, 113 I provide a slide 125 (Figs. 6, 12, 13, 15 and 16) which performs two duties, the first being to close the lower end of the space between the clamping frames 112, 113 and support the covered magazine, and the second being on its withdrawal from below said space to permit the descent of the magazine therefrom and carry a shoulder 126 thereon firmly against the back edge of the magazine for the purpose of pressing in an upwardly direction the back edge of the cover against the glued edge of the magazine, thus assuring the adherence of the cover to the magazine and ironing out any bulging portions that may be present in the back edge of said cover, the appearance of the covered magazine being thus improved. The slide 125 is operated by means comprising toggle-levers 127, vertical rods 128 pivoted at their upper ends to the jointed ends of said levers, and pivotally mounted levers 129 pivoted at one end to said rods 128 and at their other ends engaged by cams 130 on the cam-shaft 36. The toggle-levers 127 are folded upwardly by the cams 130 to positively withdraw the slide 125, as shown in Fig. 15, and straighten out downwardly under the force of springs 139 connected with them to move the slide below the space between the clamping frames 112, 113, as shown in Fig. 16, this being the reverse of the action of the toggle-levers 120.

The slide 125 will move below the space between the clamping frames 112, 113 while the frame 112 is in its receded position so as to receive the lower back edge of the magazine descending between said frames, then the frame 112 will move against the magazine supported by the slide 125 and press the same, then the slide 125 will recede and wipe its shoulder 126 against the back edge of the magazine, and then the frame 112 will recede to release the finished magazine and permit it to drop to the receiving bar-frame 131 for the magazines (Fig. 12). At the inner end of the frame 131 I provide a vertical bar-frame 132 which is utilized to push the magazines one after another as they descend along the frame 131. The bars of the frame 132 are secured at their lower ends to a transverse plate 133 carried on the inner end of a rod 134 suitably guided in a bearing 135 and carrying at its outer or front end a shoe 136 which in one part is bifurcated to ride upon the rod 86 (Fig. 2) and at another part engages the cam 137 on the shaft 36, said cam being utilized to drive said rod 134 and frame 132 rearwardly to push the magazines along the frame 131 as each magazine descends to said frame 131. A spring 138 (Fig. 2) serves to return the frame 132 to its frontward position after each rearward movement of said frame to push a covered magazine along the frame 131.

At one side of the frame 131 and in the path of the covered magazines pushed along the same, I provide a vertical plate or stop 145 (Figs. 5, 8, 12) which normally extends transversely of the machine and is connected by a spring-hinge 146 with a rigid bracket-plate 147. The plate-stop 145 will turn or yield rearwardly when a magazine is pushed against it by the bars of the frame 132, and on each rearward movement of said frame 132 it will move far enough to push a magazine against and beyond the stop 145, the latter turning rearwardly under the pressure of the magazine to permit that result and at once turning back to its normal transverse position (Fig. 5) as soon as the magazine passes it and before the frame 132 returns to its front position, so that it may act as a stop to prevent the covered magazines on the frame 131 from tilting or falling frontwardly to any material extent when the frame 132 leaves them. This action of the stop 145 assures the presence of a clear space for the covered magazines which descend one after another from between the clamping plates 112, 113, as indicated in Fig. 12.

At the front end of the machine a table 142 is provided for the flat covers for the magazines, these covers being delivered one after another to the tapes 93 by which they are carried inward to position above the rollers 89, 90. Preferably some suitable feed mechanism will be provided over the feed board or table 142 for automatically delivering the covers to the conveyer tapes 93, as is common in other classes of machines, such as printing-presses and the like, but this invention is not limited to any special feed mechanism for the covers, since various mechanisms for this work are well-known and applicable to this machine. In Figs. 7 and 8 a pneumatic feed mechanism is shown above the table or board 142 in a partly diagrammatic manner, but since said mechanism is not a necessary part of the present machine and is applicable to other machines it will be made the subject of a separate application for Letters Patent and need not be described herein.

The operation of the machine will be understood from the detailed description hereinbefore presented of the construction and action of each operative part of the machine and hence further explanation in this regard is unnecessary.

What I claim as my invention and desire to secure by Letters Patent, is:

1. In a machine for applying covers to magazines and the like, a chute upon which the uncovered magazines may be fed to a point of delivery therefrom, means for supporting a magazine-cover below the delivery end of said chute, means adapted for moving the end magazine downwardly on edge to a limited extent to receive an adhesive substance on its back edge, means for applying said substance, means for moving the said magazine downwardly to its cover, and means for applying said cover; substantially as set forth.

2. In a machine for applying covers to magazines and the like, a chute upon which the uncovered magazines may be fed to a point of delivery therefrom, means for supporting a magazine-cover below the delivery end of said chute, means adapted for successively ejecting one magazine downwardly to its cover and the next adjacent magazine downwardly to a limited extent to receive an adhesive substance, means for applying said substance to the magazine thus positioned to receive it, and means for applying the covers; substantially as set forth.

3. In a machine for applying covers to magazines and the like, a chute upon which the uncovered magazines may be fed to a point of delivery therefrom, means for supporting a magazine-cover below the delivery end of said chute, means adapted for successively ejecting one magazine downwardly to its cover and the next adjacent magazine downwardly to a limited extent to receive an adhesive substance, means for applying said substance to the magazine thus positioned to receive it, means for applying the covers, said ejecting means comprising a vertically movable frame, yielding arms carried thereby to engage one face of the magazine and having dogs to engage the upper edge of the magazine which has received the adhesive substance, and an upper part to engage and press downwardly against the next adjacent magazine; substantially as set forth.

4. In a machine for applying covers to magazines and the like, a chute upon which the uncovered magazines may be fed to a point of delivery therefrom, means for supporting a magazine-cover below the delivery end of said chute, means adapted for successively ejecting one magazine downwardly to its cover and the next adjacent magazine downwardly to a limited extent to receive an adhesive substance, means for applying said substance to the magazine thus positioned to receive it, means for applying the covers, said ejecting means comprising a vertically movable frame, yielding arms carried thereby to engage one face of the magazine and having adjustable dogs to engage the upper edge of the magazine which has received the adhesive substance, and an upper part to engage and press downwardly against the next adjacent magazine; substantially as set forth.

5. In a machine for applying covers to magazines and the like, a chute upon which the uncovered magazines may be fed to a point of delivery therefrom, means for supporting a magazine-cover below the delivery end of said chute, means adapted for successively ejecting one magazine downwardly to its cover and the next adjacent magazine downwardly to a limited extent to receive an adhesive substance, means for applying said substance to the magazine thus positioned to receive it, means for applying the covers, said ejecting means comprising a vertically movable frame, hinged dependent arms carried thereby to engage one face of the magazine and having at their upper portion dogs to engage the upper edge of the magazine which has received the adhesive substance, and an upper part to engage and press downwardly against the next adjacent magazine; substantially as set forth.

6. In a machine for applying covers to magazines and the like, a chute upon which the uncovered magazines may be fed to a point of delivery therefrom, means for supporting a magazine-cover below the delivery end of said chute, means adapted for successively ejecting one magazine downwardly to its cover and the next adjacent magazine downwardly to a limited extent to receive an adhesive substance, means for applying said substance to the magazine thus positioned to receive it, means for applying the covers, said ejecting means comprising a vertically movable frame, hinged dependent arms carried thereby to engage one face of the magazine and having at their upper portion adjustable dogs partly socketed therein to engage the upper edge of the magazine which has received the adhesive substance, and an upper part to engage and press downwardly against the next adjacent magazine; substantially as set forth.

7. In a machine for applying covers to magazines and the like, means for applying an adhesive substance to the back edge of the magazine, a pair of separated rollers for supporting the cover for said magazine, a supporting movable platen normally between said rollers, means for delivering the magazine on edge to said cover over said platen, and means for then lowering said platen to permit the magazine and cover to descend between said rollers; substantially as set forth.

8. In a machine for applying covers to magazines and the like, means for applying an adhesive substance to the back edge of the magazine, a pair of separated rollers for supporting the cover for said magazine, a supporting movable platen normally between said rollers, means for delivering the magazine on edge to said cover over said platen, means for then lowering said platen to permit the magazine and cover to descend between said rollers, and means for rotating said rollers toward each other during such descent; substantially as set forth.

9. In a machine for applying covers to magazines and the like, a pair of separated rollers for supporting the cover for a magazine, means for feeding the cover to accurate position over said rollers, a supporting movable platen normally between said rollers, means for delivering the magazine on edge to said cover over said platen, and means for then lowering said platen to permit the magazine and cover to descend between said rollers, the cover being folded onto the magazine during such descent; substantially as set forth.

10. In a machine for applying covers to magazines and the like, a pair of separated rollers for supporting the cover for a magazine, means for feeding the cover to accurate position over said rollers, a supporting movable platen normally between said rollers, means for delivering the magazine on edge to said cover, means for then lowering said platen to permit the magazine and cover to descend between said rollers, and means for rotating said rollers toward each other during such descent, the cover being folded onto the magazine during such descent; substantially as set forth.

11. In a machine for applying covers to magazines and the like, a pair of separated rollers for supporting the cover for a magazine, means for feeding the cover to accurate position over said rollers, a supporting movable platen normally between said rollers, means for delivering the magazine on edge to said cover, means for then lowering said platen to permit the magazine and cover to descend between said rollers, and means for rotating said rollers toward each other during such descent, the cover being folded onto the magazine during such descent, and said means for rotating said rollers comprising sprocket wheels on the ends of said rollers, a sprocket chain extending over the top of one of said wheels and the lower side of the other wheel, fixed wheels for supporting said chain and means for driving the chain; substantially as set forth.

12. In a machine for applying covers to magazines and the like, means for applying an adhesive substance to the back edge of the magazine, a pair of separated rollers for supporting the cover for said magazine, a supporting movable platen normally between said rollers, means for delivering the magazine on edge to said cover over said platen, and means for then lowering said platen to permit the magazine and cover to descend between said rollers, the cover being folded onto the magazine during such descent, combined with a pair of clamping members to receive said magazine from said rollers, a support for the magazine below said clamp, means for moving one of said members toward and from the other for clamping and thereafter releasing the covered magazine, and means for withdrawing said support to allow the magazine to descend from said clamping members; substantially as set forth.

13. In a machine for applying covers to magazines and the like, a pair of separated rollers for supporting the cover for a magazine, means for feeding the cover to accurate position over said rollers, a supporting movable platen normally between said rollers, means for delivering the magazine on edge to said cover over said platen, and means for then lowering said platen to permit the magazine and cover to descend between said rollers, the cover being folded onto the magazine during such descent, combined with a pair of clamping members to receive said magazine from said rollers, a support for the magazine below said clamp, means for moving one of said members toward and from the other for clamping and thereafter releasing the covered magazine, and means for withdrawing said support to allow the magazine to descend from said clamping members; substantially as set forth.

14. In a machine for applying covers to magazines and the like, a pair of separated rollers for supporting the cover for a magazine, means for feeding the cover to accurate position over said rollers, a supporting movable platen normally between said rollers, means for delivering the magazine on edge to said cover, means for then lowering said platen to permit the magazine and cover to descend between said rollers, and means for rotating said rollers toward each other during such descent, the cover being folded onto the magazine during such descent, combined with a pair of clamping members to receive said magazine from said rollers, a support for the magazine below said clamp, means for moving one of said members toward and from the other for clamping and thereafter releasing the covered magazine, and means for withdrawing said support to allow the magazine to descend from said clamping members; substantially as set forth.

15. In a machine for applying covers to magazines and the like, means for folding the cover onto a magazine, a pair of clamping members to receive and press the covered magazine, a slide below said clamping members to receive the magazine preparatory to the action of said clamping members and having a shoulder on its upper face to wipe firmly against the back edge of the cover when the slide is withdrawn from below the magazine, and means for withdrawing the slide after said clamping members engage the magazine; substantially as set forth.

16. In a machine for applying covers to magazines and the like, means for folding the cover onto a magazine, a pair of clamping members to receive and press the covered magazine, and means for pressing the back edge of the cover against the magazine and comprising a slide which affords a support for the magazine prior to said members clamping the same and which has a shoulder adapted when the slide is withdrawn to wipe against the back edge of the cover and press it against the magazine, combined with a cam for moving one of said clamping members toward the other to press the magazine, a spring for withdrawing said member from the magazine, a cam for withdrawing said slide so as to effect a positive action of said shoulder against the magazine, and a spring for restoring said slide below said clamping members; substantially as set forth.

17. In a machine for applying covers to magazines and the like, means for folding the cover onto a magazine, a pair of clamping members to receive and press the covered magazine, and means for pressing the back edge of the cover against the magazine and comprising a slide which affords a support for the magazine prior to said members clamping the same and which has a shoulder adapted when the slide is withdrawn to wipe against the back edge of the cover and press it against the magazine, combined with toggle-levers connected with one of said clamping members for actuating the same toward and from the magazine, a cam for moving said levers to effect pressure against the magazine, a spring for moving them to effect the release of the magazine, toggle-levers connected with said slide, a cam for moving said levers to positively withdraw the slide, and a spring for moving said levers to restore the slide; substantially as set forth.

18. In a machine for applying covers to magazines and the like, a chute upon which the uncovered magazines may be fed on edge to a point of delivery therefrom, means for supporting a magazine-cover below the delivery end of said chute, means for ejecting the end magazine downwardly on edge to a limited extent to receive an adhesive substance on its back edge, means for applying said substance, means for ejecting said magazine downwardly to its cover, air-suction means for holding vertical and facilitating the movement of said magazine during its descent, and means for applying the cover; substantially as set forth.

Signed at Poughkeepsie in the county of Dutchess and State of New York, this 4th day of January A. D. 1908.

GEORGE SAGUE.

Witnesses:
EDNA F. BARTH,
MARY IDA SAGUE.